US012679743B2

(12) United States Patent
Hu et al.

(10) Patent No.: US 12,679,743 B2
(45) Date of Patent: Jul. 14, 2026

(54) SYNTHESIS METHOD OF COBALT HYDROXIDE AND COBALT HYDROXIDE

(71) Applicants:GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Haihan Hu, Foshan (CN); Changdong Li, Foshan (CN); Genghao Liu, Foshan (CN); Xinghua Lu, Foshan (CN); Dingshan Ruan, Foshan (CN); Yong Cai, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 497 days.

(21) Appl. No.: 18/373,998

(22) Filed: Sep. 28, 2023

(65) Prior Publication Data

US 2024/0018012 A1 Jan. 18, 2024

Related U.S. Application Data

(63) Continuation of application No. PCT/CN2022/093593, filed on May 18, 2022.

(30) Foreign Application Priority Data

Aug. 24, 2021 (CN) .......................... 202110977138.7

(51) Int. Cl.
*C01G 51/04* (2025.01)

(52) U.S. Cl.
CPC .......... *C01G 51/04* (2013.01); *C01P 2006/12* (2013.01)

(58) Field of Classification Search
CPC .. C01G 51/04; C01P 2006/12; C01P 2002/52; C01P 2002/72; C01P 2004/03;
(Continued)

(56) References Cited

FOREIGN PATENT DOCUMENTS

| CN | 101269848 A | 9/2008 |
| CN | 102527116 A | 7/2012 |

(Continued)

OTHER PUBLICATIONS

International Search Report of PCT Patent Application No. PCT/CN2022/093593 issued on Aug. 10, 2022.

*Primary Examiner* — Anthony J Zimmer
*Assistant Examiner* — Syed T Iqbal
(74) *Attorney, Agent, or Firm* — Westbridge IP LLC

(57) ABSTRACT

The present disclosure belongs to the technical field of metal oxide materials, and discloses a synthesis method of cobalt hydroxide and cobalt hydroxide. The synthesis method includes: (1) stirring and heating ammonium citrate, introducing a protective gas, adding a cobalt salt and a mixed alkali liquor to allow a reaction, and adjusting a pH to obtain a cobalt hydroxide slurry; and (2) subjecting the cobalt hydroxide slurry to alkali-leaching, filtering, and slurrying a resulting filter residue; and washing a resulting slurry with a detergent, and drying the resulting slurry to obtain the cobalt hydroxide. In the present disclosure, ammonium citrate is used as a base solution, and a cobalt solution and a mixed alkali liquor are added to synthesize a cobalt hydroxide slurry in one step under a protective atmosphere.

7 Claims, 3 Drawing Sheets

(58) Field of Classification Search
CPC .............. C01P 2004/51; C01P 2004/61; C01P
2006/80; Y02E 60/10; Y02P 10/20
See application file for complete search history.

(56) References Cited

FOREIGN PATENT DOCUMENTS

| CN | 108946824 A | 12/2018 | |
| CN | 109987645 A | * 7/2019 | .............. H01M 4/52 |

* cited by examiner

SYNTHESIS METHOD OF COBALT HYDROXIDE AND COBALT HYDROXIDE

CROSS-REFERENCE TO RELATED APPLICATIONS

The present application is a continuation application of PCT application No. PCT/CN2022/093593 filed on May 18, 2022, which claims the benefit of Chinese Patent Application No. 202110977138.7 filed on Aug. 24, 2021. The contents of all of the aforementioned applications are incorporated by reference herein in their entirety.

TECHNICAL FIELD

The present disclosure belongs to the technical field of metal oxide materials, and specifically relates to a synthesis method of cobalt hydroxide and cobalt hydroxide.

BACKGROUND

Due to stable structure, high capacity ratio, and outstanding comprehensive performance, lithium cobalt oxide (LCO) materials are mainly used for small and medium-sized cells, and corresponding LCO batteries are widely used in small electronic devices such as notebook computers and mobile phones. With the introduction of new electronic products, there are higher and higher requirements on LCO batteries. Cobalt hydroxide is an important precursor of LCO, and the performance thereof directly affects the performance of a cathode material. Cobalt hydroxide, generally a rose red crystal, is insoluble in water and hardly soluble in strong alkalis, and is mainly used as a colorant for glass and enamel and a raw material for preparing other cobalt compounds. Cobalt hydroxide synthesized by a chemical method is prone to colloids or flocci, and has low surface activity.

A small-grained cobalt hydroxide slurry is difficult to filter and requires a lot of water; a product is prone to agglomeration during a drying process and thus is not easily dried; and cobalt hydroxide has high reaction activity and is easily oxidized into cobalt oxyhydroxide, resulting in a reduced yield. The related art discloses a method for washing a cobalt hydroxide slurry by a filter press, which reduces a loss of cobalt hydroxide during a washing process and improves a recovery rate of cobalt hydroxide. However, during a drying process, a washed material is still prone to agglomeration, oxidation, and the like, and no suitable solution is proposed for this problem.

SUMMARY OF THE INVENTION

The present disclosure is intended to solve at least one of the technical problems existing in the prior art. In view of this, the present disclosure provides a synthesis method of cobalt hydroxide and cobalt hydroxide. The cobalt hydroxide has high purity, regular particles, uniform particle size distribution, large specific surface area (SSA), large bulk density, and excellent process ability.

To achieve the above objective, the present disclosure adopts the following technical solutions:

A synthesis method of cobalt hydroxide is provided, including the following steps:

(1) stirring and heating ammonium citrate, introducing a protective gas, adding a cobalt salt and a mixed alkali liquor to allow a reaction, and adjusting a pH to obtain a cobalt hydroxide slurry; and (2) subjecting the cobalt hydroxide slurry to alkali-leaching, filtering to obtain a filter residue, and slurrying the filter residue; and washing a resulting slurry with a detergent, and drying to obtain the cobalt hydroxide.

In the present disclosure, an ammonium citrate solution is used as a base solution, and a cobalt salt and a mixed alkali liquor are added to obtain a cobalt hydroxide slurry in one step under a protective atmosphere. As a base solution, the ammonium citrate solution can serve as a dispersant for the entire reaction process to prevent the agglomeration of particles during the reaction process. The addition of a dispersant in the cobalt solution can reduce the generation of flocci and improve the active SSA of cobalt hydroxide. The alkali-leaching and detergent-washing can reduce an S content in cobalt hydroxide and protect cobalt hydroxide from oxidation and agglomeration during the drying process.

Preferably, in step (1), the ammonium citrate may be prepared into a 0.8 g/L to 1.5 g/L ammonium citrate solution in advance.

Preferably, before the ammonium citrate is heated, step (1) may further include adding ammonia water.

Further preferably, the ammonia water may have a concentration of 10 g/L to 20 g/L.

Preferably, in step (1), the protective gas may be nitrogen.

Preferably, in step (1), the heating may be conducted at 40° C. to 60° C.

Preferably, in step (1), the cobalt salt may include a cobalt sulfate solution or a cobalt chloride solution.

Further preferably, the cobalt salt may be prepared into a cobalt salt solution in advance; and a dispersant may be added to the cobalt salt solution.

Further preferably, the cobalt sulfate solution may have a concentration of 1 mol/L to 2 mol/L.

More preferably, the dispersant may be ammonium citrate.

More preferably, the ammonium citrate may have a concentration of 0.1 mol/L to 0.5 mol/L.

Preferably, in step (1), the mixed alkali liquor may include a sodium hydroxide solution, hydrazine hydrate, and ammonia water.

The ammonia aqueous solution is a complexing agent aqueous solution, which can effectively control a speed of the reaction of the cobalt sulfate aqueous solution with the sodium hydroxide aqueous solution and the morphology of formed cobalt hydroxide particles. The hydrazine hydrate can effectively and preliminarily coat cobalt hydroxide particles during the reaction process.

Further preferably, the sodium hydroxide solution may have a concentration of 5 mol/L to 15 mol/L.

Further preferably, the hydrazine hydrate may have a volume fraction of 0.5% to 1%.

Further preferably, the ammonia water may have a mass fraction of 10% to 30%.

Further preferably, a volume of the ammonia water may account for 10% to 12% of a total volume of the mixed alkali liquor.

Preferably, in step (1), the pH may be adjusted to 10 to 12.

Preferably, in step (2), the alkali-leaching may be conducted at 45° C. to 55° C. for 1 h to 2 h with a sodium hydroxide solution.

Preferably, in step (2), the detergent may be a citric acid solution.

Further preferably, the citric acid solution may be citric acid monohydrate.

Further preferably, the citric acid solution may have a concentration of 0.5 g/L to 1 g/L.

The citric acid monohydrate can not only serve as a detergent to wash a filter residue slurry (to remove excess $Na^+$ and $S^-$ in the slurry), but also serve as an antioxidant to protect cobalt hydroxide from oxidation and agglomeration during a drying process.

The present disclosure also provides cobalt hydroxide prepared by the synthesis method, where the cobalt hydroxide has an SSA of 44 $cm^2/g$ to 65 $cm^2/g$.

Compared with the prior art, the present disclosure has the following beneficial effects.

1. In the present disclosure, an ammonium citrate solution is used as a base solution, which can serve as a dispersant for the entire reaction process to prevent agglomeration of particles during the reaction process; and then a cobalt solution and a mixed alkali liquor are added to synthesize a cobalt hydroxide slurry in one step under a protective atmosphere. The addition of a dispersant in the cobalt solution can reduce the generation of flocci and improve the active SSA of cobalt hydroxide, such that the cobalt hydroxide has large bulk density and excellent processability. The alkali-leaching and detergent-washing can reduce an S content in cobalt hydroxide (a high S content will lead to low battery capacity, reduced crystallization performance, and unstable structure) and protect cobalt hydroxide from oxidation and agglomeration during the drying process.

2. The hydrazine hydrate in the mixed alkali liquor of the present disclosure is a strong reducing agent, which can effectively and preliminarily coat cobalt hydroxide particles during a reaction process; and the detergent of the present disclosure can not only serve as a detergent to wash a filter residue slurry, but also serve as an antioxidant (further coating the cobalt hydroxide particles for antioxidation) to protect the cobalt hydroxide from oxidation and agglomeration during a drying process.

DETAILED DESCRIPTION OF ILLUSTRATED EXAMPLES

The concepts and technical effects of the present disclosure are clearly and completely described below in conjunction with examples, so as to allow the objectives, features and effects of the present disclosure to be fully understood. Apparently, the described examples are merely some rather than all of the examples of the present disclosure. All other examples obtained by those skilled in the art based on the examples of the present disclosure without creative efforts should fall within the protection scope of the present disclosure.

Example 1

A synthesis method of cobalt hydroxide was provided in this example, including the following steps:

(1) A 2 mol/L cobalt sulfate solution was prepared, and then a dispersant (ammonium citrate) with a concentration of 0.5 mol/L was added to obtain a cobalt solution; and 10 mol/L liquid caustic soda was prepared, and then hydrazine hydrate with a volume fraction of 0.5% and ammonia water with a mass fraction of 10% were added to the liquid caustic soda to obtain a mixed alkali liquor, where a volume of the ammonia water accounted for 10% of a total volume of the mixed alkali liquor.

(2) 1 L of a 1 g/L ammonium citrate solution and 10 L of 15 g/L ammonia water were added as a base solution to a 100 L reactor, and then pure water was added to adjust a pH to 11; nitrogen was introduced as a protective gas, and the base solution was heated to 40° C. and stirred at a stirring frequency of 30 Hz; the cobalt salt solution (cobalt sulfate solution and ammonium citrate) and the mixed alkali liquor (liquid caustic soda, ammonia water, and hydrazine hydrate) were concurrently fed into the reactor, during which a pH was controlled at 12; and when a volume of a reaction solution was about 80% of a volume of the reactor, the feeding was stopped, and the reaction solution was further stirred for 2 h to obtain a cobalt hydroxide slurry.

(3) The cobalt hydroxide slurry was spin-dried in a centrifuge and then transferred back to the reactor, and then 50 L of a 1 mol/L sodium hydroxide solution was added to soak the cobalt hydroxide slurry for 1 h at 55° C.; the cobalt hydroxide slurry was filtered out, spin-dried, and transferred back to the reactor, then the reactor (100 L) was filled up with pure water, and a reactor body was heated to 50° C.; and a resulting mixture was stirred for 1 h at a stirring rate of 30 hz to obtain a cobalt hydroxide slurry.

(4) The cobalt hydroxide slurry was centrifuged in a centrifuge, washed with water (including 1 g/L citric acid monohydrate) at a water consumption of 50 L/Kg, and then dried in an oven at 90° C. to obtain a pink cobalt hydroxide powder with uniform morphology and large SSA.

Figure 1:
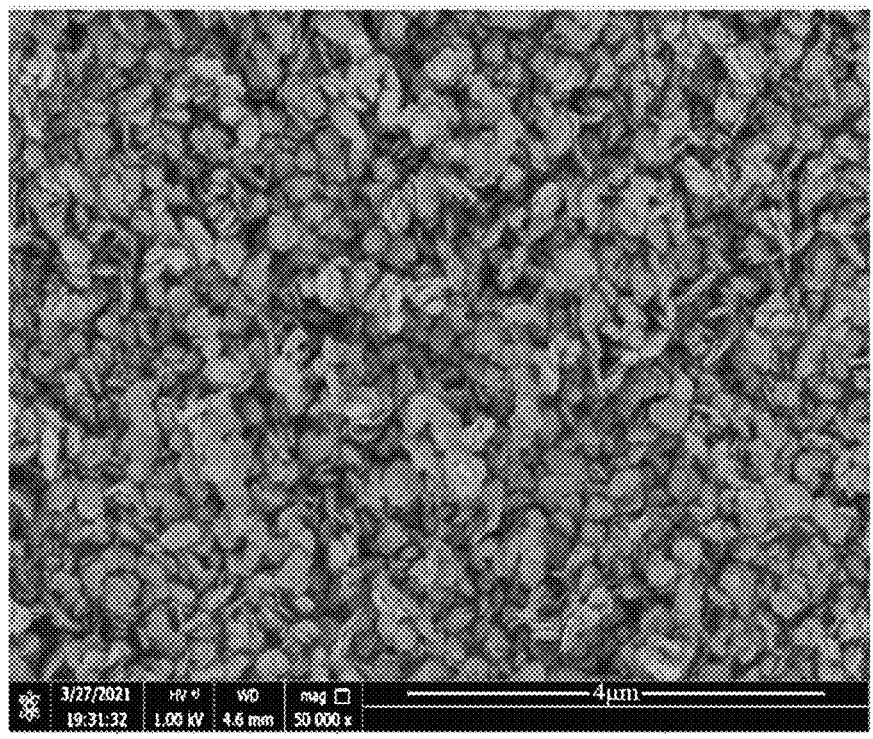
FIG. 1 is a scanning electron microscopy (SEM) image of the cobalt hydroxide prepared in Example 1 of the present disclosure.

FIG. 1 is an SEM image of the cobalt hydroxide prepared in Example 1, and it can be seen from FIG. 1 that the cobalt hydroxide prepared in Example 1 has prominent morphological consistency and no obvious agglomeration.

Table 1 shows indexes of dried cobalt hydroxide

| Co | S | Na | D50 | BET |
|---|---|---|---|---|
| 62.45 | 0.013% | 0.004% | 1.6 μm | 61 $cm^2/g$ |

It can be known from Table 1 that the cobalt hydroxide prepared in Example 1 has a very low sulfur content and a large SSA.

Example 2

A synthesis method of cobalt hydroxide was provided in this example, including the following steps:

(1) A 1 mol/L cobalt sulfate solution was prepared, and then a dispersant (ammonium citrate) with a concentration of 0.1 mol/L was added to obtain a cobalt solution; and 15 mol/L liquid caustic soda was prepared, and then hydrazine hydrate with a volume fraction of 1% and ammonia water with a mass fraction of 15% were added to the liquid caustic soda to obtain a mixed alkali liquor, where a volume of the ammonia water accounted for 10% of a total volume of the mixed alkali liquor.

(2) 1 L of a 1 g/L ammonium citrate solution and 10 L of 15 g/L ammonia water were added as a base solution to a 100 L reactor, nitrogen was introduced as a protective gas, and the base solution was heated to 60° C. and stirred at a stirring frequency of 30 Hz; the cobalt salt solution (cobalt sulfate solution and ammonium citrate) and the mixed alkali liquor (liquid caustic soda, ammonia water, and hydrazine hydrate) were concurrently fed into the reactor, during which a pH was controlled at 10; and when a volume of a reaction solution was about 80% of a volume of the reactor, the feeding was stopped, and the reaction solution was further stirred for 2 h to obtain a cobalt hydroxide slurry.

(3) The cobalt hydroxide slurry was spin-dried in a centrifuge and then transferred back to the reactor, and then a 2 mol/L sodium hydroxide solution was added to soak the cobalt hydroxide slurry for 1 h at 55° C.; the cobalt hydroxide slurry was filtered out, spin-dried, and transferred back to the reactor, then the reactor was filled up with pure water, and a reactor body was heated to 50° C.; and a resulting mixture was stirred for 1 h at a stirring rate of 30 hz to obtain a cobalt hydroxide slurry.

(4) The cobalt hydroxide slurry was centrifuged in a centrifuge, washed with water (including 0.1 g/L citric acid monohydrate) at a water consumption of 20 L/Kg, and then dried in an oven at 90° C. to obtain a pink cobalt hydroxide powder with uniform morphology and large SSA.

Figure 2:
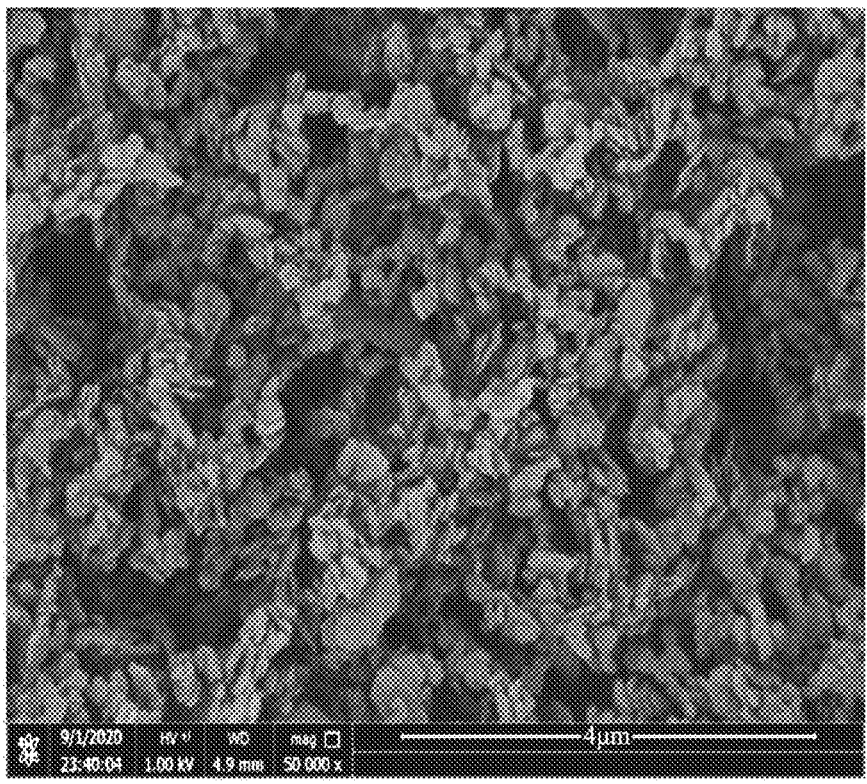
FIG. 2 is an SEM image of the cobalt hydroxide prepared in Example 2 of the present disclosure.

FIG. 2 is an SEM image of the cobalt hydroxide prepared in Example 2, and it can be seen from FIG. 2 that the cobalt hydroxide prepared in Example 2 has uniform morphology and structure and no obvious agglomeration.

Table 2 shows indexes of dried cobalt hydroxide

| Co | S | Na | D50 | BET |
|---|---|---|---|---|
| 63.50 | 0.024% | 0.005% | 3.1 μm | 44 cm²/g |

It can be known from Table 2 that the cobalt hydroxide prepared in Example 2 has a very low sulfur content and a large SSA.

Comparative Example 1

A synthesis method of cobalt hydroxide was provided in this comparative example, including the following steps:

This comparative example was different from Example 1 in that no dispersant was added to the cobalt salt solution (cobalt sulfate solution and ammonium citrate) and the base solution (that is, no dispersant was added to the cobalt salt, and no ammonium citrate was added as a base solution). Obtained cobalt hydroxide had a large particle size and poor morphological uniformity.

Figure 3:
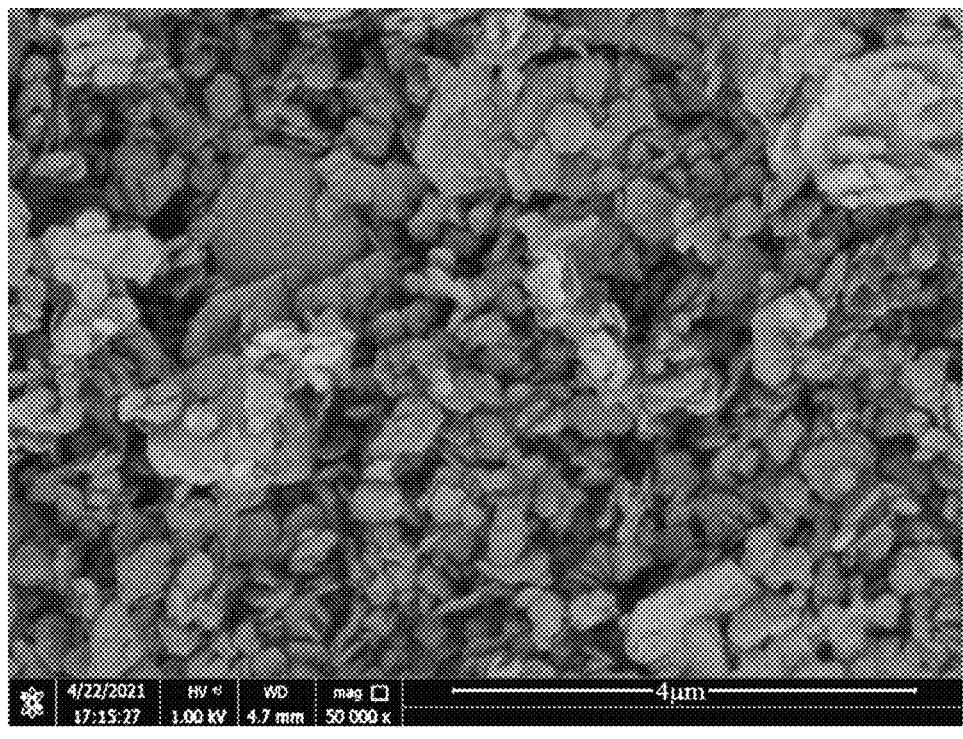
FIG. 3 is an SEM image of the cobalt hydroxide prepared in Comparative Example 1 of the present disclosure.

FIG. 3 is an SEM image of the cobalt hydroxide prepared in Comparative Example 1, and it can be seen from FIG. 3 that the cobalt hydroxide prepared in Comparative Example 1 has agglomerates with different sizes.

Table 3 shows indexes of dried cobalt hydroxide.

TABLE 3

| Co | S | Na | D50 | BET |
|---|---|---|---|---|
| 62.75 | 0.030% | 0.006% | 6.1 μm | 11 cm²/g |

It can be known from Table 3 that the cobalt hydroxide prepared in Comparative Example 1 has a large particle size and a small SSA.

Comparative Example 2

A synthesis method of cobalt hydroxide was provided in this comparative example, including the following steps:

This comparative example was different from Example 1 in that no detergent (citric acid monohydrate) was added to washing water.

Figure 4:
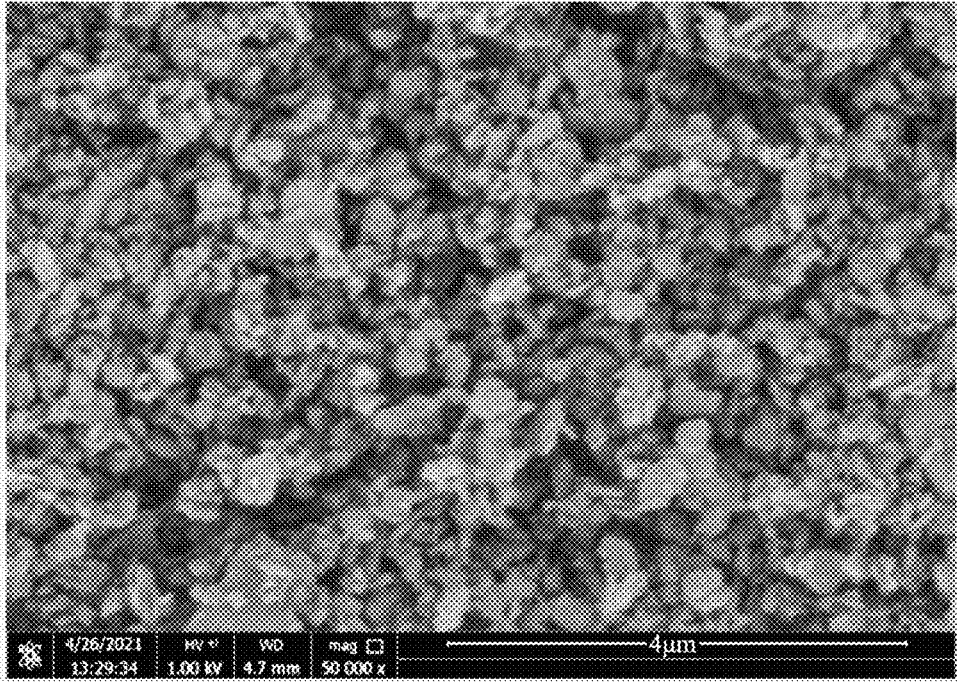
FIG. 4 is an SEM image of the cobalt hydroxide prepared in Comparative Example 2 of the present disclosure.

FIG. 4 is an SEM image of the cobalt hydroxide prepared in Comparative Example 2, and it can be seen from FIG. 4 that the prepared cobalt hydroxide has irregular morphology and obvious agglomeration, that is, the dried cobalt hydroxide has many agglomerates and is partly oxidized.

Comparative Example 3

A synthesis method of cobalt hydroxide was provided in this comparative example, including the following steps:

This comparative example was different from Example 1 in that step (3) was as follows: the cobalt hydroxide slurry was spin-dried in a centrifuge and then transferred back to the reactor, then the reactor was filled up with pure water, and a reactor body was heated to 50° C.; and a resulting mixture was stirred for 1 h at a stirring rate of 30 hz to obtain a cobalt hydroxide slurry.

Table 4 shows indexes of dried cobalt hydroxide.

TABLE 4

| Co | S | Na | D50 | BET |
|---|---|---|---|---|
| 62.1 | 0.110% | 0.003% | 2.2 μm | 50 cm²/g |

It can be seen from Table 4 that, according to ICP test, the dried cobalt hydroxide obtained in Comparative Example 3 has an S content of 1,100 ppm.

Figure 5:
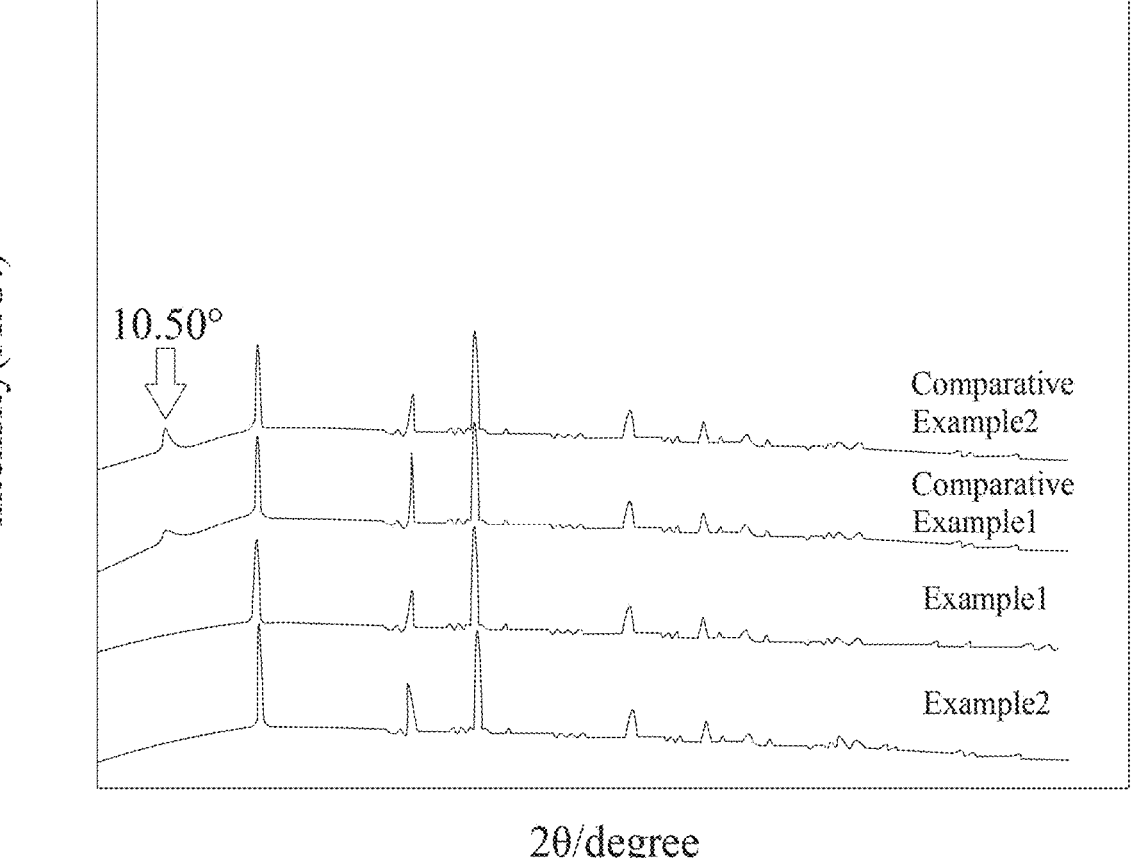
FIG. 5 shows X-ray diffractometry (XRD) patterns of the cobalt hydroxide prepared in Examples 1 and 2 and Comparative Examples 1 and 2.

FIG. 5 shows XRD patterns of the cobalt hydroxide prepared in Examples 1 and 2 and Comparative Examples 1 and 2, and it can be seen from FIG. 5 that a diffraction peak of cobalt oxyhydroxide appears at about 10.50° in the XRD pattern of Comparative Example 2 at 2θ, indicating that there is cobalt oxyhydroxide in the cobalt hydroxide. Cobalt oxyhydroxide is an impurity, and the presence of cobalt oxyhydroxide indicates that the cobalt hydroxide has been oxidized, resulting in a reduced yield.

The present disclosure is described in detail with reference to the accompanying drawings and examples, but the present disclosure is not limited to the above examples. Within the scope of knowledge possessed by those of ordinary skill in the technical field, various changes can also be made without departing from the purpose of the present disclosure. In addition, the examples in the present disclosure or features in the examples may be combined with each other in a non-conflicting situation.

The invention claimed is:

1. A synthesis method of cobalt hydroxide, the cobalt hydroxide having a specific surface area (SSA) of 44 cm²/g to 65 cm²/g, wherein the synthesis method comprises the following steps:

(1) stirring and heating ammonium citrate, introducing a protective gas, adding a cobalt salt and a mixed alkali liquor to allow a reaction, and adjusting a pH to obtain a cobalt hydroxide slurry; and (2) subjecting the cobalt hydroxide slurry to alkali-leaching, filtering to obtain a filter residue, and slurrying the filter residue; and washing a resulting slurry with a detergent, and drying to obtain the cobalt hydroxide;

in step (1), the mixed alkali liquor comprises a sodium hydroxide solution, hydrazine hydrate, and ammonia water;

in step (2), the detergent is a citric acid solution.

2. The synthesis method according to claim 1, wherein in step (1), the ammonium citrate is prepared into a 0.8 g/L to 1.5 g/L ammonium citrate solution in advance.

3. The synthesis method according to claim 1, wherein in step (1), the protective gas is nitrogen.

4. The synthesis method according to claim 1, wherein in step (1), the cobalt salt comprises one selected from the group consisting of cobalt sulfate and cobalt chloride.

5. The synthesis method according to claim 4, wherein the cobalt salt is prepared into a cobalt salt solution in advance; and a dispersant is added to the cobalt salt solution, and the dispersant is ammonium citrate.

6. The synthesis method according to claim 1, wherein a volume of the ammonia water accounts for 10% to 12% of a total volume of the mixed alkali liquor.

7. The synthesis method according to claim 1, wherein in step (2), the alkali-leaching is conducted at 45° C. to 55° C. for 1 h to 2 h with a sodium hydroxide solution.

* * * * *